Figure 1:
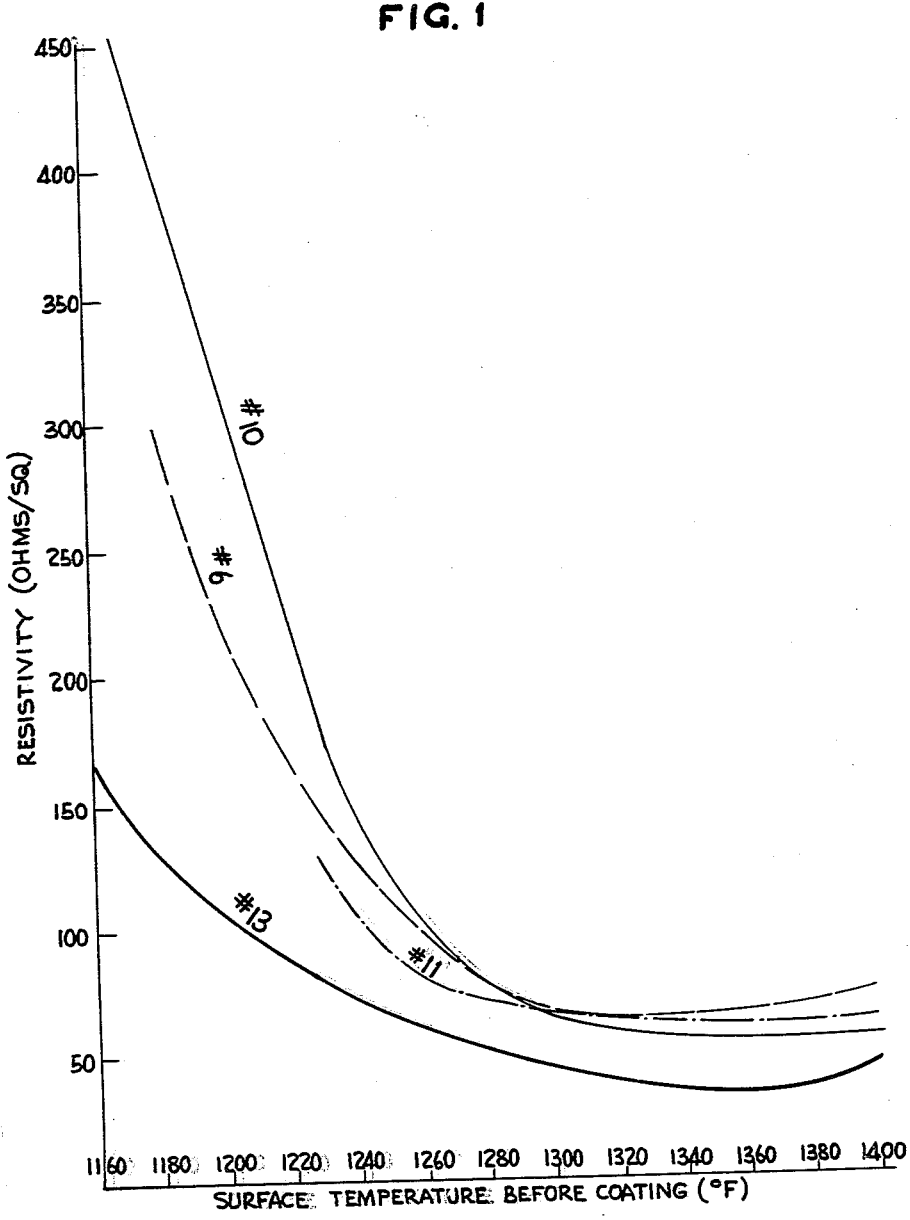

INVENTORS
ARNOLD E. SAUNDERS and
WILLIAM E. WAGNER
BY Oscar H. Spencer
ATTORNEY

р
3,107,177
METHOD OF APPLYING AN ELECTROCONDUCTIVE TIN OXIDE FILM AND COMPOSITION THEREFOR

Arnold E. Saunders, Saxonburg, and William E. Wagner, Verona, Pa., assignors to Pittsburgh Plate Glass Company, Allegheny County, Pa., a corporation of Pennsylvania Filed Jan. 29, 1960, Ser. No. 5,474
10 Claims. (Cl. 117—211)

This invention relates to novel transparent electroconductive articles, novel methods for their production, and novel compositions useful for application to the heated surface of a ceramic base to form such articles.

It is known that a transparent electroconductive film may be deposited upon a refractory base, such as glass, by heating the glass surface to an elevated temperature, for example above 400° F. but below the temperature at which the base becomes molten, and subjecting the glass while hot to the action of various compounds of tin. The prior art indicates that tin oxide films can be produced from organic as well as inorganic compounds of tin. However, when organic tin compounds are used, the prior art teaches that the organic tin composition applied to the heated surface of a ceramic or vitreous base, such as glass, should not form HCl vapors upon contacting the glass as disclosed in U.S. Patent No. 2,567,331 to Gaiser and McAuley or should be a halogen-free liquid or solution as disclosed in U.S. Patent No. 2,833,902 to Gaiser and Thomas.

The prior art also teaches that the presence of a halogen in the film forming composition promotes high resistivity at the interface between an electrode applied to the surface of the glass sheet and the film formed by reacting stannic tetrachloride. This high resistance at the film-electrode interface is particularly high when the electrode is composed of a silver flux.

The prior art believed that using organic tin compositions to form tin oxide films instead of $SnCl_4$ avoided the formation of anhydrous hydrochloric acid at the hot glass surface. It was believed that the HCl gas present during filming with a tin chloride caused a permanent cloud or haziness in the film. Such haze interfered with the optical clarity of the film and was particularly objectionable when the film was to be used in airplane windshields, optical viewing instruments and similar locations where clarity of vision was a prime requisite. Therefore, one of the objects of the prior art was the use of organic tin compositions where the elimination of the HCl vapor from the scene of the reaction at the surface of the hot glass was a prerequisite to forming suitable films free from haze.

Prior to the present invention, it was also generally accepted that a penalty had to be paid to improve bus bar to film contact and film haziness. This penalty involved a reduction in specific conductivity of the film formed and a higher cost per unit of tin oxide in the resulting film when organic tin compounds were substituted for tin chloride as the filming agent.

Various other methods have been employed to permit the use of cheaper inorganic compounds, such as tin tetrachloride, rather than the more expensive organic tin compounds to produce higher conductivity tin oxide films without the accompanying haze. Such patents as U.S. Patent No. 2,617,741 to Lytle, which discloses the application of a metal oxide film on the surface of a glass sheet to serve as an interlayer between the transparent tin oxide coating and the glass base, U.S. Patent No. 2,617,742 to Olsen, which discloses a kaolin treatment to reduce the alkaline content of the glass surface and U.S. Patent No. 2,617,745 to Raymond and Dennison, which teaches the application of a solution of a silicon halide to form an intermediate coating upon which the tin oxide coating is deposited and U.S. Patent No. 2,602,032 to Gaiser, which teaches applying a solution of a silicate to form a transparent silica coating on the glass sheet before applying an electroconductive tin oxide film are all based on the theory that the chlorine in the tin tetrachloride reacts with the sodium of a soda-lime-silica glass base to form minute particles of sodium chloride crystals which cause haze.

Thus, previous efforts have involved a conscious effort to either cause the surface to be reacted with a compound of tin to be reduced in its alkali metal content or else to insure the absence of a halogen or specifically HCl vapors from the region of the glass surface when the tin oxide film forming coating composition is applied to the glass surface. Thus, it has been necessary in the past either to provide a series of steps in the way of preliminary treatment preparatory to the application of stannic tetrachloride composition which forms highly conductive tin oxide films on contacting heated glass or else to utilize a composition which does not contain a halogen compound, thereby producing coatings having lower specific conductivity.

The present invention flies in the face of the teachings of the prior art by providing organic tin compositions capable of producing high conductivity and freedom from haze formation on the surface of the coated glass sheet.

Applicants have provided a novel method for glass coating which incorporates heating the glass sheet to an elevated temperature, and applying to the glass sheet a novel composition which contains a mixture of a halogen containing compound and an organic tin compound. In the best embodiment of the present invention a fluoride containing compound and a chlorine containing compound is included in the composition in combination with an organic tin compound.

U.S. Patent No. 2,566,346 to Lytle and Junge teaches that the addition of fluorine to a tin chloride containing composition increases the conductivity of the coating formed from applying the composition to a hot surface of a heated glass sheet. However, it has been necessary to utilize one of the surface treatments in order to produce a coating free from haze. This additional surface treatment forms a surface different from the chemical composition throughout the thickness of the glass sheet subjected to the coating operation. Also, such treatment is objectionable because of the time and cost factors involved.

The addition of fluorine to a tin chloride composition according to the teaching of Lytle and Junge U.S. Patent No. 2,566,346 does not improve the rate of film formation at the film-bus bar interface. The resulting article is still susceptible of breakage due to the hot spots which form at the interfaces when electrical current is transmitted between spaced bus bars through the conductive film. Considerable work has been done to improve the conductivity at the bus bar-film interface. The prior art suggests applying a strip of gold to the bus bar (Lytle U.S. Patent No. 2,648,754), applying an undercoating of electroconductive film extending inwardly beyond the bus bar (Lytle U.S. Patent No. 2,730,598) and bridging the interface with a metal overlay (Gaiser U.S. Patent No. 2,628,299). However, each of these suggestions involves additional steps to produce a commercially acceptable article. These steps are both costly and time consuming.

The present invention provides a novel family of filming compositions and novel filming techniques that produce tin oxide films having high transparency, high electro-conductivity, good electrical contact with bus bars and substantially no haze without requiring any of the surface treatments to improve the haze characteristics or additional operations in the vicinity of the bus bar-film interface to improve the electrical contact at this potential danger zone.

According to the present invention, filming a heated glass sheet surface with a composition comprising a halogen containing compound in combination with an organic tin compound produces a tin oxide film having greater electroconductivity than the conductivity possible utilizing organic tin compounds that are either halogen free or do not form HCl vapors upon contacting the heated glass sheet. Furthermore, in spite of the premonitions of the prior art, films produced according to the teachings of the present invention are substantially free from haze and have intimate electrical contact with ceramic silver bus bars when applied, despite the presence of a halogen in the film forming composition.

Glass sheets coated with tin oxide films formed by spraying compositions comprising an organic tin compound and a halogen containing compound have been used as glazing closures of either laminated glass or of unlaminated tempered glass. The coated surface may be grounded to serve as a static discharge. When spaced bus bars are employed with the coating and a voltage impressed across the bus bars, current passes through the film. Coated, tempered glass sheets of the latter type are used as zoo panels. Other uses for articles coated with these films are identical to those employed previously for tin oxide coatings, namely, as viewing closures for vehicles having defrosting and deicing properties, transparent electroconductive coatings for cathode ray tubes, space heaters, static discharge devices, electroluminescent panels and the like, and any other uses previously performed by transparent electroconductive metal oxide coatings on glass and other ceramic materials.

It is understood that the glass base for the film is normally ordinary window or soda lime silica glass. However, films may be deposited on other refractory materials, including borosilicate glass, china, mica, phosphate glass, silicon carbide, tungsten carbide, porcelain, stone or other refractory compositions which melt at temperatures above 1150° F. to 1350° F.

Organic tin compounds which have been used successfully to produce suitable coatings include dibutyl tin diacetate, dibutyl tin oxide, tributyl tin oxide, dibutyl tin dilaurate, tributyl tin acetate, dibutyl tin maleate, dibutyl tin di-2-ethyl hexoate, hydrazium trifluoro stannite, stannous acetate, stannous octoate and dibutyl tin dilaurate. Tetraphenyl tin and triethyl tin hydroxide have extreme mammalian toxicity but produce suitable films. Other suitable compositions include di-n-octyl tin dichloride, tributyl tin chloride, stannous pyrophosphate, triphenyl tin chloride, tributyl tin pentachlorophenate, phenyl tin oxide, dilauryl tin dichloride, butyl stannonium diacetate, tributyl tin dodecyl succinate, dimethyl tin dichloride, tetrabutyl tin, etc.

The following experiments were performed with various compositions containing organo tin compounds which were found to produce conductive films requiring no preliminary surface treatment of the glass sheet or of the bus bars. All the films produced in the examples and tables listed below had good haze properties and intimate electrical contact at the bus bar interface unless otherwise noted.

EXAMPLE I

The influence of the presence of fluorine on the conductivity of the resulting film was determined by the following experiments, which were performed using two separate hand spray guns, Binks Model 19, set at 50 p.s.i. and siphon liquid feed. One gun dispensed a solution of dibutyl tin diacetate approximately 30 percent by weight in ethyl alcohol 3A; the other spray gun dispensed anhydrous HF 12.9 percent by weight in 3A ethyl alcohol. Five plate glass plates of soda-lime-silica glass, four inches by six inches by one-quarter inch were coated along their margins with thin strips of ceramic silver and then heated in a furnace set at 1250° F. for four and one half minutes. The heating baked the ceramic silver strips to form bus bars adhering to the glass surface. Each glass sheet was removed immediately after heating and its bus bar-containing surface sprayed simultaneously by both guns, the sprays intermingling before contacting the glass surface. The coated plates had films free from haze. The films were about 100 millimicrons thick as determined by their interference color, which was second order blue. This is equivalent to the thickness of commercially produced coatings for coated glass panels used for aircraft glazing closures produced by tin chloride compositions. The surface resistivity of such commercially produced films of this thickness is 100 ohms/square. The influence of relative concentrations of fluoride is shown in Table I, which follows.

*Table I*

INFLUENCE OF FLUORIDE CONCENTRATION ON CONDUCTIVITY OF FILMS

| Dibutyl tin diacetate solution applied (ml.) | Fluoride solution applied (ml.) | Surface resistivity of film (ohms/square) |
|---|---|---|
| 5 | 0 | 1,500 |
| 3 | 3 | 130–135 |
| 4¼ | 5 | 95–100 |
| 4½ | 8 | 80–85 |
| 3 | 9 | 75–80 |

From the results of the experiments performed and recorded in Table I above, it is obvious that increasing the fluoride content of the organic tin composition coming into contact with a heated glass sheet increases the conductivity of the film formed.

All the plates produced from the experiments of Table I were power-tested by impressing 650 volts between the bus bars for five minutes. The samples stood up well under this power test. In contrast, similarly treated plates coated with a stannic chloride composition developed hot spots and sparked at the bus bars immediately upon subjection at 400 volts across the bus bars. This indicates that the interface between the ceramic silver bus bars and the films formed by the teachings of the present invention is vastly superior to the bus bar-film interface when the films are produced by prior art techniques.

EXAMPLE II

A number of samples of polished plate glass 18 inches square by ¼ inch thick were treated in the following manner. Ceramic silver bus bars were screened on opposite parallel edges and the glass sheets were heated in a furnace set at 1250° F. for 4½ minutes. This fired the bus bars onto the glass sheet and brought the glass surface to film forming temperature. Each glass sheet was passed at a rate of 9 inches per second across a spray upon leaving the furnace after the heating operation.

During these experiments, the humidity in the spray chamber was raised to the worst humidity conditions tolerated for commercial operation by providing the atmosphere with an open steam jet. This raised the absolute humidity to .025 pound/pound of air and a relative humidity of 68 percent. High humidity conditions increase the likelihood of haziness in the film.

Two spray guns Binks Model 19 set at 50 p.s.i. atomizing air pressure were angled so that the sprays intermingled with each other before striking the glass. One gun dispensed a 50 percent dibutyl tin acetate solution in 3A ethyl alcohol; the other gun sprayed a 12.9 percent HF solution in alcohol.

The films obtained were free from haze and had a resistance of 100 ohms between bus bars. The samples were successfully power-tested at 650 volts for five minutes to determine the effectiveness of the bus bar-film interface.

EXAMPLE III

Additional experiments were performed using solutions A, B, C and D tabulated in Table II below.

Table II

|  | Solution A | Solution B | Solution C | Solution D |
|---|---|---|---|---|
| Dibutyl Tin Diacetate_____g__ | 31.25 | | | |
| Dibutyl Tin Oxide_____g__ | | 100 | 100 | 100 |
| NH₄OH 58%_____cc__ | | 20 | 65 | 70 |
| NH₄FHF_____g__ | | | 34 | |
| Ethanol (3A)_____cc__ | 75 | 50 | 50 | 50 |
| Glacial Acetic Acid_____cc__ | | | 80 | 50 |
| HF (12.9% in 3A Ethanol)____cc__ | 80 | | | 256 |
| HF (22% in 3A Ethanol)_____cc__ | | | 80 | |
| Ammonium Acetate_____g__ | | | 50 | |
| pH | 5.5–6 | 5.5–6 | 6 | 5.5 |

In these solutions, the percentages of tin in the organic tin compounds was 34 percent by weight of dibutyl tin diacetate and 48 percent by weight of dibutyl tin oxide. Since these mixtures formed solutions, it was possible to form films by spraying the solutions from a single spray gun. Dibutyl tin oxide is a preferred tin source because of its high concentration of tin.

Each glass sheet was heated as in the previous experiments recited in the previous examples. Films having thicknesses of second order blue films (100 millimicrons) had surface resistivities of 60 ohms/square. Since the specific resistivity in ohm centimeters is determined by the film thickness, the specific resistivity of these films was $6 \times 10^{-4}$ ohm centimeters. Laboratory tests using solutions A, B, C and D listed in Table II above produced clear films free from haze which made good connection with bus bars as evidenced by successful power testing the samples at 650 volts for five minutes.

EXAMPLE IV

The following halogen-free organic tin compounds produced films having the following resistivity when the glass sheet was heated to a surface temperature of 1260° F. and immediately thereafter sprayed with one of the compounds listed below.

|  | Ohms/square |
|---|---|
| Dibutyl tin oxide | 2,000 |
| Tributyl tin acetate | 1,000 |
| Dibutyl tin maleate | 2,000 |
| Dibutyl tin Di-2 ethyl hexoate | 15,000 |

EXAMPLE V

Ten solutions were prepared according to Table III listed below. Ten panels were heated for 4½ minutes in an oven until the surface temperature of the glass sheet read 1270° F. and then the heated sheet was immediately taken from the furnace and sprayed. Each of the samples reported was a 12 inch square sheet of ¼ inch thick regular plate glass. A Binks Model 21 spray gun was used to spray the coating solutions onto the heated glass sheet with the liquid flow set at 10 cc. for 3 seconds and the atomizing air set at 40 to 45 p.s.i. The glass was moved past the spray gun in about 3 seconds. The coating thickness was of the first order blue or 100–120 millimicrons.

These experiments determined that the presence of a

Table III
ORGANIC TIN SOLUTIONS

|  | #1 | #2 | #3 | #4 | #5 | #6 | #7 | #8 | #9 | #10 |
|---|---|---|---|---|---|---|---|---|---|---|
| Dibutyl tin oxide (g.) | 100 | 100 | 100 | 100 | 100 | 100 | 100 | 100 | 100 | 100 |
| Ammonium acetate (g.) | 0 | 12 | 28 | 33 | 36 | 40 | 45 | 50 | 0 | 40 |
| Glacial acetic acid (g.) | 55 | 55 | 55 | 45 | 41 | 0 | 0 | 0 | 55 | 0 |
| 20% HF in 3A alcohol (g.) .83 g./cc. | 0 | 12 | 28 | 41 | 51 | 55 | 68 | 80 | 0 | 55 |
| n-propyl alcohol (g.) | 10 | 10 | 10 | 15 | 50 | 55 | 55 | 55 | 10 | 55 |
| total solution (g.) | 163 | 187 | 216 | 221 | 231 | 223 | 237 | 248 | 163 | 223 |
| Percent F to tin | 0 | 3.9 | 9.4 | 13.8 | 17.2 | 18.5 | 22.8 | 26.9 | 0 | 18.5 |
| Percent HCl to tin | .5 | .5 | .5 | 1.0 | 1.0 | 2.0 | 2.0 | 2.0 | 0 | 0 |
| Resistivity, ohms/sq. 100–120 mmµ film | 1,300 | 850 | 400 | 300 | 200 | 65 | 65 | 65 | 1,300 | 65 | small amount of HCl in the film forming solution was not detrimental to the conductivity of the film formed. In addition, the films were relatively free from haze and demonstrated the feasibility of utilizing solutions containing HCl to form highly conductive films free from haze.

EXAMPLE VI

After having determined the feasibility of incorporating small amounts of HCl in organo-fluoro film forming compositions, the effect of surface temperature on resistivity was determined for a number of plate glass samples 12 inches square and ¼ inch thick, which were heated until a thermosensitive element trained on the glass sheet surface indicated that a given temperature was attained. Some samples were sprayed with composition #10 of Table III, which contains no HCl. Others were sprayed with composition #6 of Table III, which contains 2 percent HCl by weight based on Sn. Still others were sprayed with a similar composition containing 4 percent HCl by weight based on Sn. Except for the differences in temperatures and film forming compositions, the samples were sprayed in the same manner using the same equipment as in Example V. Surface resistivity is listed for each sample tested in Table IV, wherein the columns list the samples sprayed with a given solution and the rows list the temperature to which the surface of the sample was heated before spraying.

Table IV
RESISTIVITY VERSUS FILM FORMING TEMPERATURES

| Temperature, °F. | Surface resistivity in ohms/sq. of 2nd order blue film (100–120 millimicrons) with constant flow of approx. 3.3 cc/sec. | | |
|---|---|---|---|
|  | Solution #6 (2% HCl; 18% F based on Sn) | Solution #10 (0% HCl; 18% F based on Sn) | Solution #11 (4% HCl; 18% F based on Sn) |
| 1,160 | | 500, 500, 550 | |
| 1,180 | 300, 300 | | 130, 135 |
| 1,200 | | 300, 300, 320 | |
| 1,225 | 140, 150, 145 | | |
| 1,250 | | 140, 145, 140 | |
| 1,270 | 88, 90, 92 | | 80, 82, 80 |
| 1,280 | | 85, 90, 85 | |
| 1,300 | | 60, 65, 65 | |
| 1,320 | 60, 65, 60 | 60, 65 | 65, 70 |
| 1,370 | 75, 80 | 55, 60 | |
| 1,400 | 75, 80 | 55, 60 | 65, 70 |

From the above data, FIG. 1 was drawn, determining that a 100 ohm/square film of tin oxide having a thickness of about 100 millimicrons can be produced by a process that requires an initial surface temperature of 1265° F. to form the film from the organo-fluoro tin composition containing no HCl, whereas only a 1250° F. surface temperature is needed to form an equivalent film by spraying with an organo-fluoro tin composition containing 4 percent HCl by weight based on tin. This may not seem to be much of a difference at first blush, but it must be remembered that the viscosity of glass lessens very quickly with increasing temperatures in this range. It is very important to provide a commercially acceptable panel free from heat distortion. Therefore, any reduction in film forming temperature increases the glass viscosity and results in a superior product.

EXAMPLE VII

The following solutions numbers 12 and 13 were prepared as typical of the inorganic compositions used prior to the present invention. The formulation of these solutions follows in Table V.

Table V

|  | Solution #12 | Solution #13 |
|---|---|---|
| Distilled Water_____cc____ | 1,765 | 1,765 |
| Methanol_____cc____ | 565 | 565 |
| 10% Dioctyl sodium sulphosuccinate_____cc____ | 230 | 230 |
| Phenyl hydrazine hydrochloride_____grams____ | 160 | 160 |
| Anhydrous stannic tetrachloride_____cc____ | 250 | 250 |
| 48% HF_____grams____ | 32 | 160 |

A dozen samples were heated and immediately treated with solution numbers 6, 10, 12 or 13 as reported in previous tables. Plates 1 to 3 were heated and sprayed with a tin chloride composition without any preliminary surface treatment. Plates 4 through 8 were pretreated by dipping the glass sheet in a silicon tetrachloride solution to produce a silica film on the surface of the glass sheet before heating and spraying the sheet. Plates 9 through 12 were not pretreated, but sprayed with organo-halo-tin compositions while heated. The coated glass sheets were then measured for haze utilizing a Hunter haze meter.

The haze factor is the ratio of the light scattered by a material compared to the total light transmitted through the material. Where only one value appears, this value is the average of 4 determinations taken in different areas centrally of each of the sides of the sample. Where 2 readings appear, they are individual determinations made in each of the 2 halves of the sample. The results appear in Table VI.

Table VI
INORGANIC—NO PRETREATMENT

| Sample No. | Solution used | Haze measurements, percent | |
|---|---|---|---|
| 1_____ | #13 | 1.26 | 1.37 |
| 2_____ | #13 | 2.16 | 1.62 |
| 3_____ | #13 | 1.53 | 1.21 |

INORGANIC—PRETREATED

| | | | |
|---|---|---|---|
| 4_____ | #13 | 0.22 | 0.28 |
| 5_____ | #13 | 0.21 | 0.09 |
| 6_____ | #13 | 0.10 | 0.12 |
| 7_____ | #12 | 0.29 | |
| 8_____ | #12 | 0.22 | |

ORGANIC—NO PRETREATMENT

| | | | |
|---|---|---|---|
| 9_____ | #10 | 0.16 | |
| 10_____ | #10 | 0.12 | |
| 11_____ | #6 | 0.21 | |
| 12_____ | #6 | 0.17 | |

The above table proves that haze was diminished to an average value of .165% without pretreatment using organo-fluoro-tin compositions compared to an average value of .191% from the costly, time consuming silica tetrachloride dipping procedure of the prior art followed by tin chloride spraying. Such improvement, while small, is believed significant.

In order to explain the distinctions of the present invention over the art of record, reference is made to the drawings.

FIG. 1 of the drawings compares the resistivity of films with the surface temperature to which the glass sheet is heated immediately before spraying with various compositions. Compositions 6 and 11 according to the present invention are compared with each other and with compositions 12 and 13 of the prior art in this figure.

Figure 2:
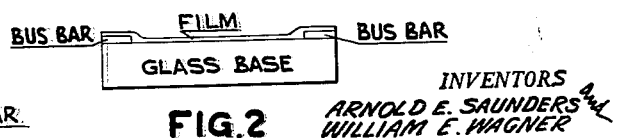
Figure 3:
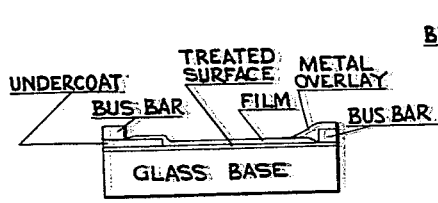

FIGS. 2 and 3 are illustrative sectional views of articles produced according to the present invention and according to the prior art, respectively.

The chart in FIG. 1 resulted from the experiments reported in Table IV. It was determined from these experiments and those reported in Table III that increasing the fluorine concentration up to about 18% fluorine by weight based on tin increased the conductivity, but that greater concentrations of fluorine had no effect on film conductivity. However, amounts of HCl up to 4% by weight based on tin lowered the temperature requirements for producing a film of commercially acceptable conductivity, say 100 ohms/square. FIG. 1 also shows that the resistivity of films produced from organic solutions 6 and 11 are higher than those from fluoride containing tin chloride composition 13. However, the penalty in conductivity loss for an improvement in haze and film to bus bar contact is less than that which occurs in the prior art, of which composition 9 of Table III is typical, producing a resistivity of 1300 ohms/square at a surface temperature at which compositions 6 and 10 provide films having resistivities of 65 ohms/square.

A comparison of FIGS. 2 and 3 shows how articles produced according to the present invention are superior to prior articles whose films result from spraying with tin chloride compositions. The article of FIG. 2 results from spraying a surface of a heated glass base with an organo-halo-tin composition. Note that the film formation at the bus bars is substantially the same as it is on the remainder of the glass sheet surface. FIG. 3 discloses how the film formation is inhibited in the vicinity of the bus bar when an inorganic tin halide composition is used as the film former and depicts two techniques employed by the prior art to improve the film to bus bar contact. On the left-hand side an undercoat is applied beneath the bus bar which makes improved electrical contact with the film to bridge the highly resistant interface that would otherwise form between the film and the bus bar. On the right-hand side, a metal overlay is shown bridging the gap between the film and the bus bar. The treated surface of the FIG. 3 article has a different composition from that throughout the thickness of the glass sheet, namely, one substantially free of alkali metal oxide. This surface is not necessary to produce the FIG. 2 article.

Various examples have been shown for purposes of illustrating the present invention. However, it is contemplated that various other materials may be employed as equivalents of those illustrated. The best organo-halo-tin compositions include dibutyl tin oxide, 18% fluorine and 2% HCl by weight based on tin in the organic tin composition employed and have a pH between 5.5 and 6. However, up to 4% HCl produced acceptable films and any amount of fluorine that can be dissolved will work, except that concentrations in excess of 18% fluorine based on tin are expensive and produce no additional benefits. Sufficient ammonium acetate is incorporated as a buffer to help promote solubility of the fluorine. It has been found that increasing the fluoride concentration by additional HF inhibits solubility of the fluoride. Unless sufficient buffer is incorporated to keep the pH above about 4.5, HF is hard to dissolve. However, the conductivity of the film produced by spraying decreases with an increase of pH of the filming composition. A maximum pH of 7 should not be exceeded for the filming composition because alkaline solutions promote gelling of the organo-halo-tin composition.

The gist of the present invention resides in the incorporation of halogen containing compositions as part of organo-halo-tin film forming compositions to form articles such as depicted in FIG. 2 rather than articles such as depicted in FIG. 3 formed from spraying tin chloride compositions which require additional steps to prepare the surface and the film-bus bar interface to avoid the defects characteristic of tin chloride treatment.

What is claimed is:

1. A method of producing a transparent electroconductive tin oxide film having a haze factor less than one percent and being capable of intimate electrical contact with a ceramic silver bus bar on a surface of a ceramic base, said surface having substantially the same chemical composition as said base, which comprises heating the surface to a film forming temperature and applying to the heated surface a composition having a pH between 4.5 and 7 and containing an organic tin compound, HCl, and an ionizable fluorine containing compound, said HCl concentration being up to 4 percent by weight based on the weight of tin and said surface being heated to a film forming temperature above 400° F. at which the HCl component provides lower resistivity to the electroconductive film than said film forming composition consisting of said organic tin compound and an ionizable fluorine containing compound as the essential ingredients.

2. A method as in claim 1 wherein said ceramic base is a glass sheet and said fluorine containing compound is HF.

3. A method as in claim 1 wherein said organic tin compound is dibutyl tin oxide and said composition contains up to about 18 percent by weight of fluorine based on the weight of tin.

4. A method as in claim 3 wherein said composition contains about 2 to 4 percent by weight HCl based on the weight of tin.

5. A method as in claim 4 wherein the base is a soda-lime-silica glass and said surface is heated to a temperature of between 400° F. and about 1260° F.

6. A film forming composition consisting essentially of an organic solvent, an organic tin compound, HCl, and an ionizable fluorine containing compound, said composition containing up to 4 percent by weight HCl based on the weight of the tin and having a pH of between 4.5 and 7.

7. A composition as in claim 6 containing up to about 18 percent by weight of fluorine based on the weight of tin.

8. A composition as in claim 7 wherein said fluorine containing compound is HF.

9. A composition as in claim 6 containing about 2 to 4 percent by weight HCl based on the weight of tin.

10. A composition as in claim 9 wherein said organic tin compound is dibutyl tin oxide.

References Cited in the file of this patent

UNITED STATES PATENTS

| | | |
|---|---|---|
| 2,566,346 | Lytle et al. | Sept. 4, 1951 |
| 2,567,331 | Gaiser et al. | Sept. 11, 1951 |
| 2,570,245 | Junge | Oct. 9, 1951 |
| 2,614,944 | Lytle | Oct. 21, 1952 |

FOREIGN PATENTS

| | | |
|---|---|---|
| 494,379 | Great Britain | Oct. 25, 1938 |

OTHER REFERENCES

Kendall: "Smith's College Chemistry," third revised edition, D. Appleton Century Company, 1935, pages 596–7.